United States Patent [19]
Hama et al.

[11] Patent Number: 5,033,821
[45] Date of Patent: Jul. 23, 1991

[54] ELEMENT SELECTING DEVICE

[75] Inventors: Yoshihiro Hama, Saitama; Nobuyuki Nagai, Tokyo, both of Japan

[73] Assignee: Asahi Kogaku Kogyo Kabushiki Kaisha, Tokyo, Japan

[21] Appl. No.: 426,026

[22] Filed: Oct. 24, 1989

[51] Int. Cl.[5] .............................................. G02B 5/22
[52] U.S. Cl. .................................... 350/315; 350/318; 355/66; 355/32
[58] Field of Search ............... 350/315, 314, 316, 311, 350/317, 318; 355/65, 66, 68, 32, 71, 327

[56] References Cited

U.S. PATENT DOCUMENTS

| | | | |
|---|---|---|---|
| 4,030,833 | 6/1977 | Barbieri | 350/318 |
| 4,080,050 | 3/1978 | Huber | 350/318 |
| 4,141,653 | 2/1979 | Arnold | 350/317 |
| 4,285,587 | 8/1981 | Schiff et al. | 355/66 |
| 4,505,561 | 3/1985 | Beckman et al. | 355/66 |
| 4,825,252 | 4/1989 | Suzuki et al. | 355/32 |

Primary Examiner—Bruce Y. Arnold
Assistant Examiner—Loha Ben
Attorney, Agent, or Firm—Sandler, Greenblum, & Bernstein

[57] ABSTRACT

An element selecting device for locating one of a plurality of elements on a predetermined plane which comprises a horizontally movable supporting member which supports the plurality of elements on the predetermined plane, wherein the movement of the supporting member is controlled according to the signals of sensors therein. Consequently, by using the element selecting device, in a filter conversion device, for example, the device can be structured simply and reliably with filters of different color separation functions being disposed in a row.

15 Claims, 4 Drawing Sheets

ELEMENT SELECTING DEVICE

BACKGROUND OF THE INVENTION

This invention relates to an element selecting device having a function capable of selecting one of a plurality of optical elements, such as optical filters, and locating it at a predetermined position in an optical path, and more particularly to an element selecting device arranged so as to be smoothly moved in a predetermined plane having a positional relationship with the optical path.

An image processing device is known which makes copies by employing a so-called electrophotographic system. In an image processing device such as an image scanner, reflected light from an original irradiated by an illuminating optical system focuses an image on a light receiving element such as a CCD (Charge Coupled Device) sensor through a reduction optical system. The optical image corresponding to the image of the original is converted into a series of electrical image signals.

On the other hand, in a color image processing device, the reflected light from the original is focused on the light receiving element through color separation filters respectively corresponding to a particular color, and then, a plurality of optical images each corresponding to these colors are converted to a series of electrical image signals.

Generally, the above color image processing device is arranged to read the image signals corresponding to three primary colors, i.e. red(R), green(G), and blue(B); and to selectively locate one of three kinds of filters in an optical path of the reflecting light from the original. An image is realized on the light receiving element according to the located filter. An ND filter also is employed as well as three color filters for regulating an optical length and amount of light. Therefore, four kinds of filters are selectively inserted in the optical path.

A filter conversion device which selectively inserts one of a plurality of filters into the optical path has been suggested in various types of mechanical systems. For example, there is a filter conversion device which has a disk plate capable of being transversely revolved having a plurality of round holes thereon, each of the holes are formed at positions at which a predetermined consentient circle is equally divided, and round-shaped filters are engaged in the holes, respectively. When the disk plate is revolved around the shaft, the surface of the filters are transverse and perpendicular to the axis of the optical path.

In the color image processing device, a minimization of the device has been recently required and therefore, element selecting devices of a small size are needed. Since the element selecting device using the rotatable disk plate requires a container with a height equivalent to the length of a diameter of the disk, it has been difficult to construct the compact equipment employing the element selecting device described above.

SUMMARY OF THE INVENTION

It is therefore an object of this invention to provide an improved element selecting device capable of being disposed in various kinds of equipment employing an element selecting device and thereby allowing the equipment to be miniaturized.

For this purpose, according to this invention, there is provided an element selecting device for placing one of a plurality of optical elements at a desired position, the element selecting device comprising:

a frame member supporting the elements in a row arrangement and being movable in a predetermined plane along a direction in which the elements are arranged;

drive means for generating a driving force for moving the frame member;

a disk plate member, arranged to be rotated by the driving force, for moving the frame member in accordance with a rotation of the disk plate member; and control means for controlling the frame member movement so as to move the frame member by a predetermined amount required for replacing an element at the desired position with another element adjacently arranged when the disk plate member is rotated by a predetermined angle.

DESCRIPTION OF THE ACCOMPANYING DRAWINGS

DESCRIPTION OF THE PREFERRED EMBODIMENTS

Figure 1:
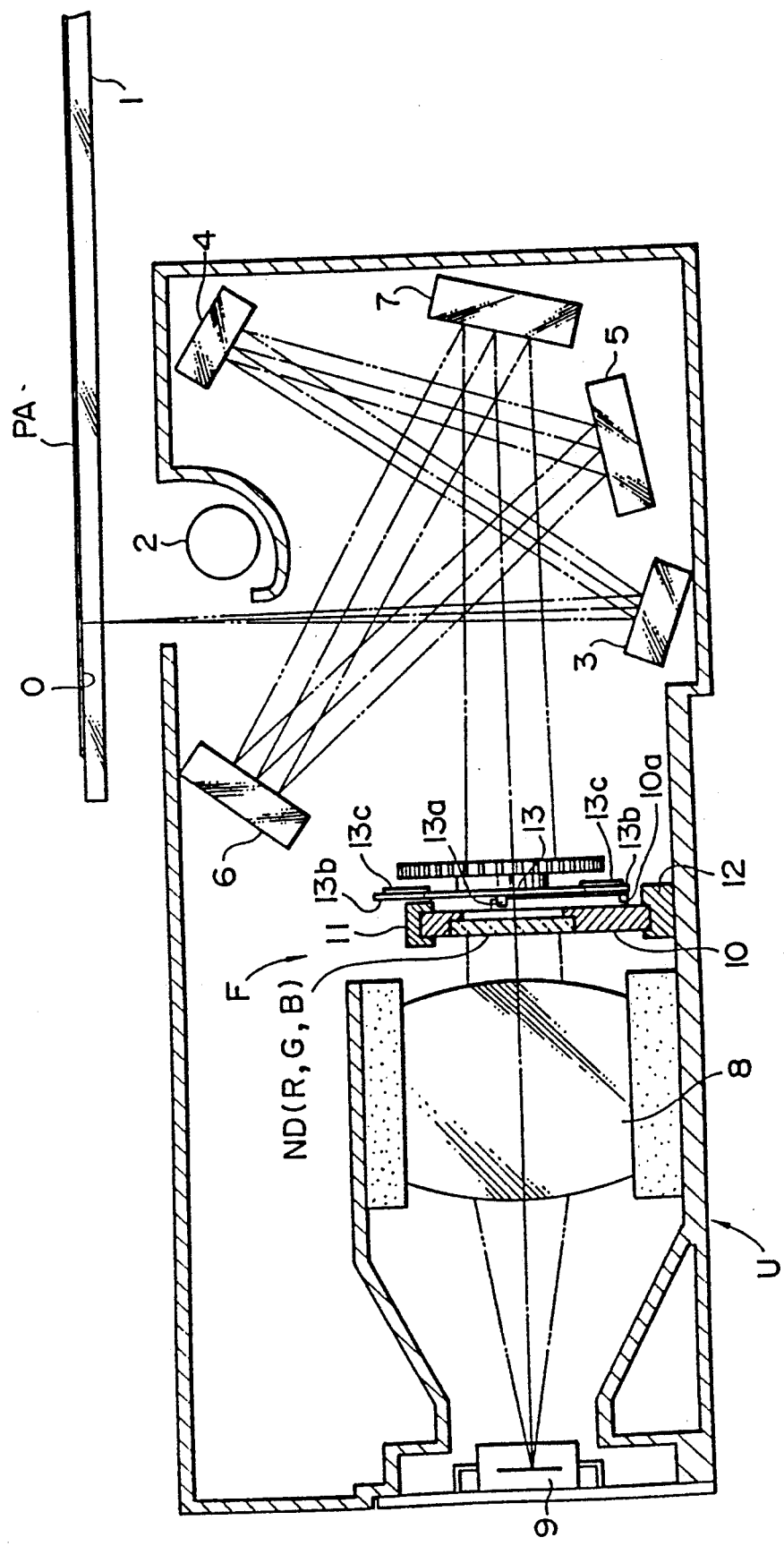
FIG. 1 is a schematic sectional side view of a principal part of a color image processing device incorporating a filter conversion device in one embodiment of the present invention.

FIG. 1 shows a schematic sectional side view of a principal part of a color image processing device incorporating a filter conversion device according to the present invention.

The color image processing device U is arranged so as to read a color image of an original PA placed on a transparent plate 1. A reading process for reading the color image is as follows; a surface 0 of the original PA is exposed to light radiated from a fluorescent lamp 2, a reflected light from the surface 0 is further reflected on a surface of a plurality of mirrors 3, 4, 5, 6 and 7, then conducted to a condenser lens 8 through a filter on a filter conversion device F. The color image read by color image processing unit U is focused on a CCD (Charge Coupled Device) sensor 9 disposed at the position of a focus of the condenser lens 8, and the optical image on the original PA is converted to image signals by the CCD sensor 9.

Figure 2:
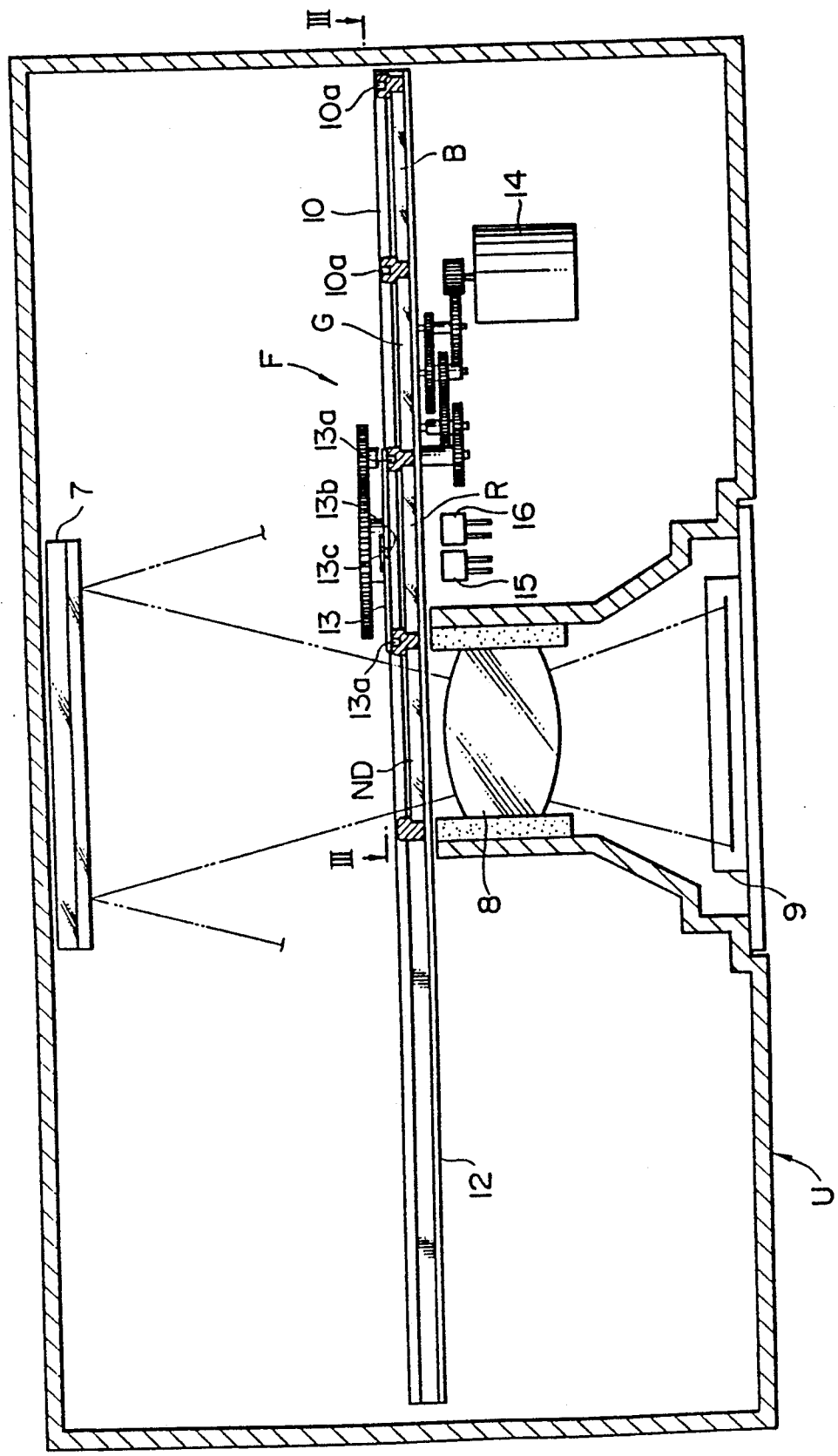
FIG. 2 shows a plan view of the color image processing device shown in FIG. 1.
Figure 3:
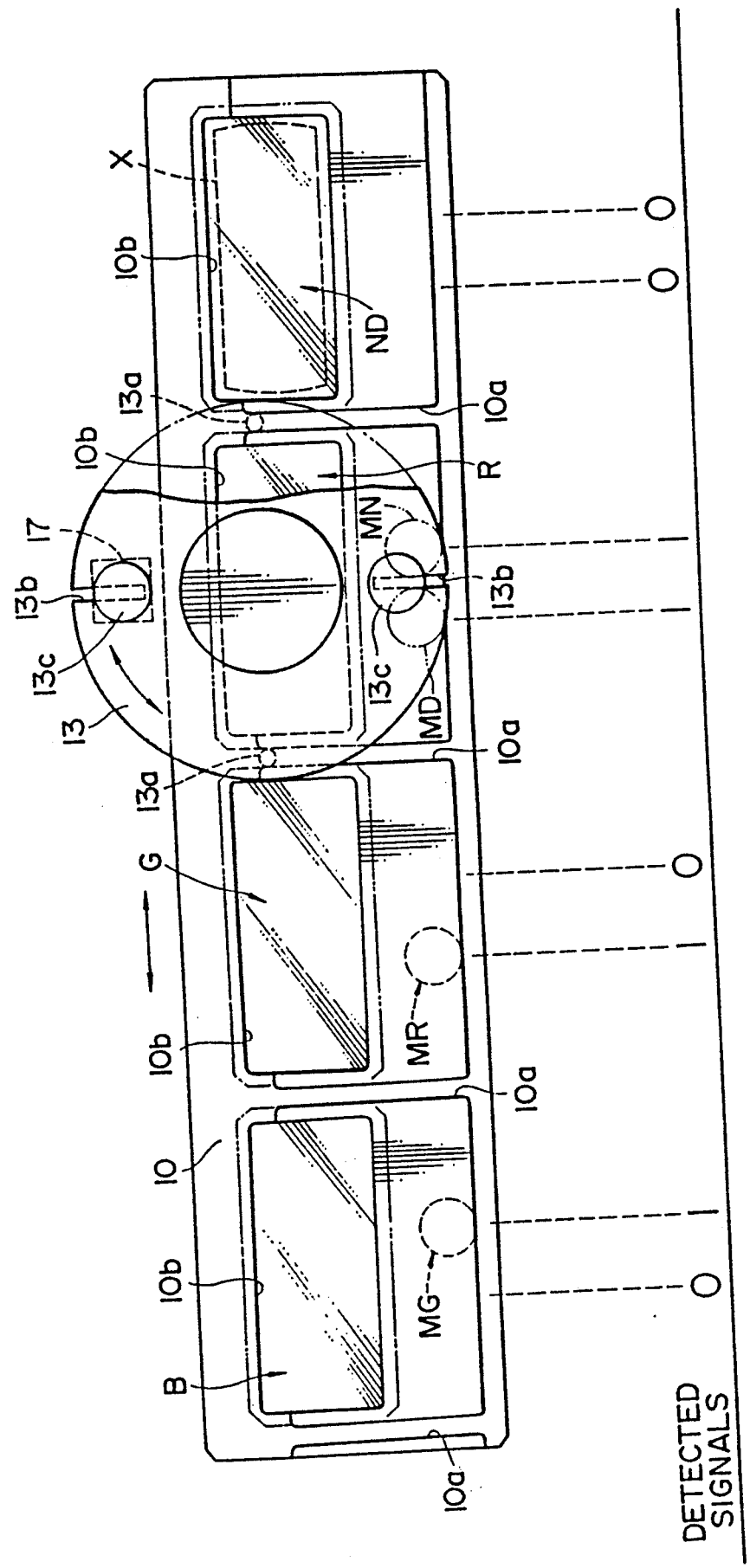
FIG. 3 shows a view of a principal part of the filter conversion device of FIG. 1, sectioned along a line III—III of FIG. 2.

FIG. 2 shows a plan view of the color image processing device of FIG. 1, and FIG. 3 shows a section view of a principal part of a filter conversion device F viewed from a direction indicated by arrows III—III in FIG. 2.

The filter conversion device F is a device for locating a filter in a predetermined plane perpendicular to an axis of the optical path of the reflected light by mirror 7, conducted from the surface 0 of the original PA.

One filter is selected from four filters, three of which respectively pass a light having a wavelength corresponding to the three primary colors, i.e., R(red) filter, G(green) filter and B(blue) filter, and the other is an ND (Neutral Density) filter which is effective for adjusting an optical length and amount of the light.

The filter conversion device comprises a supporting plate 10 for supporting the ND, R, G and B filters in a row, a pair of guide rails 11, 12 for moving the supporting plate 10 in a direction along which the filters are arranged, and a disk plate 13 and drive motor 14 for moving the supporting plate 10 along its longitudinal direction. The pair of guide rails 11, 12 are fixed and the disk plate 13 is rotatably placed at predetermined positions within the color image processing device, respectively, by supporting members (not shown).

The drive motor 14 is controlled based upon output signals from light reflection type photo sensors 15, 16 which detect predetermined positions on the supporting plate 10 respectively located with predetermined positional relationships with the filters, and from another light reflection type photo sensor 17 which detects a predetermined position of the disk plate 13. A light reception area of the CCD sensor 9 is substantially a rectangular area X in FIG. 3; and each of filters ND, R, G and B is formed as a rectangular shape which is capable of covering the area X.

The supporting plate 10 has a plurality of rectangular holes 10b where the filters are fixed, respectively. Between the holes 10b, there are a plurality of long grooves 10a formed perpendicular to the direction of the row along which the filters are arranged. The supporting plate 10 is slidably supported at its lateral ends along its longitudinal direction with the pair of guide rails 11, 12.

The pair of guide rails 11, 12 are supported with a supporting member (not shown) and disposed in front of the condenser lens 8, on the predetermined position between the mirror 7 and the condenser lens 8.

On the disk plate 13, a pair of pins 13a, 13a are disposed opposite to each other as on a predetermined circle in the plane, and at the edge portion of the disk plate 13, a pair of slits 13b, 13b are formed; wherein a line 13a—13a and a line 13b—13b make a right angle with each other. The pair of pins 13a, 13a are slidably engaged with the long grooves 10a on the supporting plate 10. This disk plate 13 is rotatably supported with a supporting member (not shown), and mechanically connected to a drive motor 14 with a gear train having a predetermined deceleration ratio. The pair of pins 13a, 13a are disposed to have a pitch therebetween which is the same pitch as that of the long grooves 10a therebetween.

Consequently, when the disk plate 13 is driven to revolve for a half turn by the drive motor 14, one of the pins 13a extendingly disposed on the disk plate 13 slides along the long groove 10a according to the engagement with long groove 10a. In other words, a pair of pins 13a, 13a extendingly disposed on the disk plate 13 opposite to each other are engaged with two of long grooves 10a formed on the supporting plate 10 at a predetermined pitch, when the disk plate 13 is not driven. When the drive motor 14 is driven, therefore revolving the disk plate 13, one of the pins 13a is released from its engagement with the long groove 10a, and another pin 13a is driven still engaged with the long groove 10a, accordingly, the supporting plate 10 is driven to slide in accordance with the engagement of the pin 13a with the long groove 10a, namely, the supporting plate 10 is moved in accordance with the revolution of the disk plate 13. When the disk plate 13 is driven to revolve by a half turn, the supporting plate 10 is driven to slide by the pitch between two long grooves 10a, 10a along the guiding direction of the pair of guide rails 11, 12.

The photo sensors 15, 16 are disposed opposite to the supporting plate 10, and specifically fixed at the position opposite to the adjacent portion of the holes 10b formed in the supporting plate 10.

Another photo sensor 17 is fixed at the position opposite to the slits 13b, 13b of the disk plate 13 without the supporting plate 10 therebetween. On the other hand, at the slits 13b, 13b of the disk plate 13, reflection plates 13c, 13c are disposed on the reverse side of the disk plate 13 and opposite to the photo sensor 17 for reflecting a light radiated from the photo sensor 17. The above enables the photo sensor to detect the slits 13b, 13b formed at edge sides of the disk plate 13.

On the opposite side of the supporting plate 10, a reflection plate MR is disposed at an adjacent portion of the filter G, a reflection plate MG is disposed at an adjacent portion of the filter B, reflection plates MD and MN are disposed at an adjacent portion of the filter R. When the supporting plate 10 is driven by the pin 13a on the disk plate 13 in response to a revolution of the disk plate 13, and the reflection plate MR is moved in accordance with a movement of the supporting plate 10. When the filter G is located on the position opposite to the disk plate 13, the photo sensor 16 detects the reflection plate MR. When the supporting plate 10 is driven to slide and the filter B faces the disk plate 13, the photo sensor 15 detects the reflection plate MG. When the supporting plate 10 is driven to slide and the filter R faces the disk plate 13, the photo sensors 16 and 15 respectively detect the reflection plates MD and MN.

In other words, the output signals from the photo sensors 15, 16 are as follows: when the filter ND is located in an optical path of a light from the irradiated surface O of the original PA to the condenser lens 8, the photo sensors 15, 16 respectively detects the reflection plates MN and MD, and the output signals from the photo sensors 15, 16 are ON, ON (1,1), when the filter R is located on the above optical path, the photo sensor 16 detects the reflection plate MR and the output signals are OFF, ON (0,1), when the filter G is located on the optical path, the photo sensor 15 detects the reflection plate MG and the output signals are ON, OFF (1,0), and when the filter B is located on the optical path, these photo sensors 15, 16 detect no reflection plates and the output signals are OFF, OFF (0,0).

Figure 4:
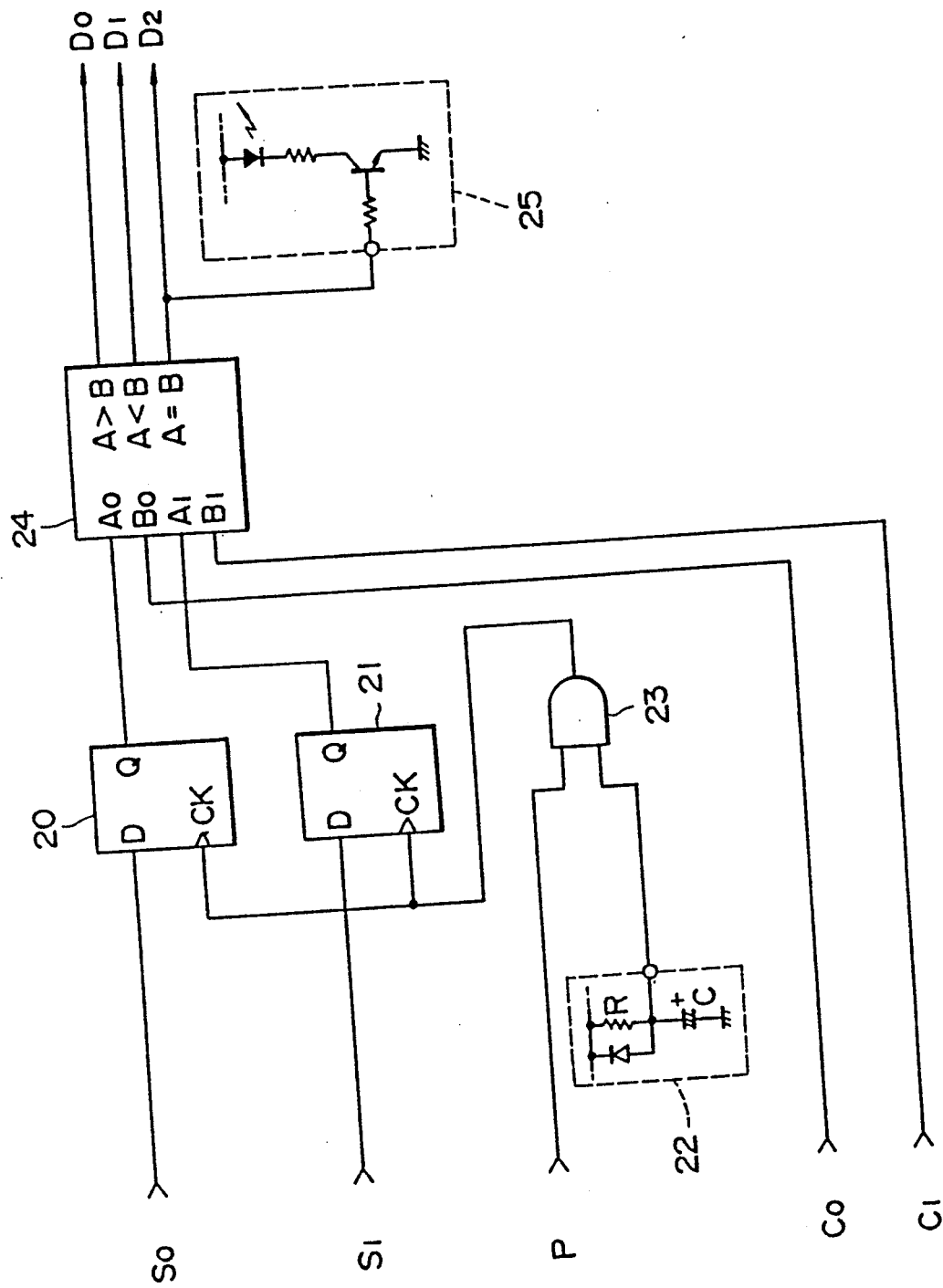
FIG. 4 shows a block diagram of a control circuit of a motor for driving the filter conversion device of FIG. 1.

FIG. 4 shows a block diagram of a control circuit of the drive motor 14. This control circuit consists of latches 20, 21 for temporarily storing the inputted signals, power-on-reset circuit 22 having a predetermined time constant, an AND gate 23, a comparator circuit 24, and a display circuit 25.

A detection signal $S_0$ of the photo sensor 15 is sent to the latch 20. A detection signal $S_1$ of the photo sensor 16 is sent to the latch 21. The output signal P of the photo sensor 17 and the output signal of the power-on-reset circuit 22 are sent to the AND gate 23, and the output signal of the AND circuit 23 is sent to latches 20, 21 as a trigger signal for them, while control signal $C_0$ and $C_1$ are sent to the comparator circuit 24. The comparator circuit 24 compares the control signals $C_0$, $C_1$ with the output signals $S_0$, $S_1$, respectively. If these signals are determined to be equal, respectively, a signal $D_2$, which indicates that a control operation by the control circuit is completed, is sent to the display circuit 25. On the other hand, when the signals $C_0$, $C_1$, and $S_0$, $S_1$ are determined to be not equal, respectively, a drive signal $D_0$ or $D_1$ is sent to the drive motor 14. The drive motor 14 is driven to rotate clockwise or counterclockwise according to the drive signal $D_0$ or $D_1$. In other words, in this control circuit, at every timing of the detection signal P, namely, at every timing when the photo sensor 17 detects the slit 13b, the detection signals $S_0$, $S_1$ of the photo sensor 15, 16 respectively, are latched and compared in the comparator circuit 24. Then, according to the drive signals $D_0$, $D_1$ which are the result of the comparison, the drive motor 14 is driven clockwise or counter-clockwise respectively.

This cycle is repeated until the control signals $C_0$, $C_1$ and the detection signals $S_0$, $S_1$ are determined to be equal, respectively. Consequently, by indicating the desired filter with the control signals $C_0$, $C_1$, the control circuit in FIG. 4 controls the drive motor 14 to drive. Accordingly, the disk plate 13 is controlled to rotate, and the desired filter is automatically located perpendicular to the axis of the optical path of a light conducted from the mirror 7 PA to the condenser lens 8.

Meanwhile, the power-on-reset circuit 22 sends a signal to the AND gate 23, which is lifting with a predetermined time constant bqased upon ja value R and C when the power is turned on. This signal is for extracting the detection signal P of the photo sensor 17 from the AND gate 23 as a trigger signal for latches 20, 21.

According to the construction described above, the filters ND, R, G and B are formed to cover the light reception area X of the CCD sensor 9 in the necessary and minimum size, therefore, the size of the filters can be miniaturized. Moreover, as the filters are supported on the supporting plate 10 in a row, the height of the device employing the element selecting device according to the invention can be formed low within the device. Applying this feature, various kinds of imaging apparatus can be compactly constructed.

It may be considered that another type of photo sensor is employed, though the photo sensors 15, 16, 17 are of the light reflecting type in this embodiment. For example, each of the sensors can be submitted to that of the light transmission type. This embodiment is a color image processing device employing the element selection device, and the element selection device can be applied to color copy machines, etc.

As described above, according to this invention, the elements are disposed in a row, which makes it possible to lower the height and simplify the construction of the device.

And according to this invention, the element selecting device can be constructed by employing another optical element instead of the filters. For example, it may be considered that a plurality of Fresnel lenses are provided on the supporting plate instead of the filters, each of the lenses respectively having a predetermined focal length. This arrangement is able to be applied to a copy machine having a function capable of varying a magnifying power.

What is claimed is:

1. An element selecting device for placing one of a plurality of optical elements at a desired position, said element selecting device comprising:
   a frame member supporting said elements in a row arrangement and being movable in a predetermined plane along a direction in which said elements are arranged;
   drive means for generating a driving force for moving said frame member;
   a disk plate member, arranged to be rotated by said driving force, for moving said frame member in accordance with a rotation of said disk plate member; and
   control means for controlling movement of said frame member so as to move said frame member by a predetermined amount required for replacing said one of a plurality of optical elements at said desired position with another adjacently arranged said one of a plurality of optical elements when said disk plate member is rotated by a predetermined angle.

2. The element selecting device according to claim 1, wherein said elements comprise a plurality of optical color filter units, each of said filter units respectively passing a light corresponding to a predetermined wavelength.

3. The element selecting device according to claim 2, wherein said plurality of filter units comprises a red filter, a blue filter, a green filter and an ND filter.

4. The element selecting device according to claim 1, wherein said predetermined angle is 180 degrees.

5. The element selecting device according to claim 4, wherein said control means includes a pair of first engagement members provided on both edges of a predetermined diameter line of said disk plate member, and a pair of second engagement members adapted to be brought into and out of engagement with said first engagement members.

6. The element selecting device according to claim 5, wherein said pair of first engagement members are pins and said pair of second engagement members are grooves.

7. The element selecting device according to claim 6, wherein a width of said one of a plurality of optical elements substantially corresponds to a pitch of said pair of pins.

8. The element selecting device according to claim 1, further comprising means for selecting one of said plurality of elements, wherein said control means is adapted to lock said frame member when said selected element selected by said means for selecting is located at said desired position.

9. The element selecting device according to claim 8, wherein said means for selecting comprises a plurality of reflection members respectively provided with each of said elements.

10. The element selecting device according to claim 1, wherein said control means includes at least one first engagement member provided on an edge of a predetermined diameter line of said disk plate member, and at least one second engagement member adapted to be brought into and out of engagement with said at least one first engagement member.

11. A filter conversion device for placing one of a plurality of color filter units at a desired position on a predetermined plane, said filter conversion device comprising:
   a frame member being movable in said predetermined plane for supporting said plurality of color filter units in a row arrangement; and
   control means for controlling said frame member, said control means adapted to reciprocally move said frame member along a direction in which said color filter units are arranged, wherein said control means includes at least one first engagement member provided at an edge of a predetermined diameter line of a disk plate member, and at least one second engagement member adapted to be brought into and out of engagement with said at least one first engagement member.

12. An element selecting device for placing one of a plurality of elements at a desired position, said element selecting device comprising:
a frame member, on which said elements are arranged in a row arrangement, being movable in a predetermined plane along a direction in which said elements are arranged;
drive means for generating a driving force for moving said frame member;
means for selecting one of said elements arranged on said frame member; and
control means for controlling said frame member movement so as to move said frame member by said driving force generated by said drive means, said control means being further adapted to lock said frame member when said selected element is located at said desired position, wherein said control means includes at least one first engagement member provided at an end of a predetermined diameter line of a disk plate member, and at least one second engagement member adapted to be brought into and out of engagement with said at least one first engagement member.

13. The element selecting device according to claim 12, wherein said elements comprise a plurality of optical color filter units, each of said color filter units respectively passing a light corresponding to a predetermined wavelength.

14. The element selecting device according to claim 13, wherein said plurality of color filter units comprises a red filter, a blue filter, a green filter and an ND filter.

15. The element selecting device according to claim 12, wherein said means for selecting comprises a plurality of reflection members respectively provided with each of said elements.

* * * * *